(12) United States Patent
Resheff et al.

(10) Patent No.: US 11,494,701 B1
(45) Date of Patent: Nov. 8, 2022

(54) ADVERSARIAL USER REPRESENTATIONS IN RECOMMENDER MACHINE LEARNING MODELS

(71) Applicants: Yehezkal Shraga Resheff, Jerusalem (IL); Shimon Shahar, Hasharon (IL); Oren Sar Shalom, Hasharon (IL); Yanai Elazar, Hasharon (IL)

(72) Inventors: Yehezkal Shraga Resheff, Jerusalem (IL); Shimon Shahar, Hasharon (IL); Oren Sar Shalom, Hasharon (IL); Yanai Elazar, Hasharon (IL)

(73) Assignee: Intuit Inc., Mountain View, CA (US)

( * ) Notice: Subject to any disclaimer, the term of this patent is extended or adjusted under 35 U.S.C. 154(b) by 1015 days.

(21) Appl. No.: 16/204,389

(22) Filed: Nov. 29, 2018

(51) Int. Cl.
| | | |
|---|---|---|
| G06Q 30/02 | (2012.01) | |
| G06F 17/11 | (2006.01) | |
| G06K 9/62 | (2022.01) | |
| G06N 20/20 | (2019.01) | |
| G06F 16/9035 | (2019.01) | |

(52) U.S. Cl.
CPC ......... *G06N 20/20* (2019.01); *G06F 16/9035* (2019.01); *G06F 17/11* (2013.01); *G06K 9/6262* (2013.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 10,594,813 | B1 * | 3/2020 | Koehler | G06N 20/00 |
| 2017/0017975 | A1 * | 1/2017 | Sheppard | G06Q 30/0204 |
| 2017/0140262 | A1 * | 5/2017 | Wilson | H04L 67/125 |
| 2018/0129961 | A1 * | 5/2018 | Kailas | G06Q 30/0202 |
| 2018/0165697 | A1 * | 6/2018 | Stolorz | G06N 5/04 |
| 2019/0188562 | A1 * | 6/2019 | Edwards | G06N 3/04 |
| 2019/0286747 | A1 * | 9/2019 | Modarresi | G06N 20/00 |
| 2019/0324744 | A1 * | 10/2019 | Alam | G06F 16/906 |

(Continued)

OTHER PUBLICATIONS

Pazzani, M.J., "A Framework for Collaborative, Content-Based and Demographic Filtering", Artificial Intelligence Review, vol. 13, Issue 5-6, Dec. 1999 (16 pages).

(Continued)

*Primary Examiner* — Andrew B Whitaker
(74) *Attorney, Agent, or Firm* — Ferguson Braswell Fraser Kubasta PC

(57) ABSTRACT

A method includes generating recommendations and user structures by applying a recommender machine learning model to training user information and item information, and generating, from the user structures and by applying a demographic machine learning model, demographic predictions of users represented by the user structures. The method further includes generating a first accuracy measure of the demographic machine learning model based on a first comparison of the demographic predictions with demographics of the users. A recommender loss function is generated based on the first accuracy measure and a second comparison of the recommendations with selections of users, where the recommender loss function uses the first accuracy measure to suppress detectability by the demographic machine learning model. The method further includes updating the recommender machine learning model according to the recommender loss function.

20 Claims, 7 Drawing Sheets

(56) References Cited

U.S. PATENT DOCUMENTS

2019/0332946 A1* 10/2019 Han ................. G06N 20/00
2019/0378050 A1* 12/2019 Edkin ............... G06N 20/20
2020/0019699 A1* 1/2020 Araujo .............. G06N 3/08

OTHER PUBLICATIONS

Elazar, Y. et al., "Adversarial Removal of Demographic Attributes from Text Data", Proceedings of the 2018 Conference on Empirical Methods in Natural Language Processing, Brussels, Belgium, Nov. 4, 2018 (13 pages).
Berlioz, A., et al., "Applying Differential Privacy to Matrix Factorization", Proceedings of the 9th ACM Conference on Recommender Systems, Vienna, Austria, Sep. 16-20, 2015, pp. 107-114 (8 pages).
Rendle, S. et al., "BPR: Bayesian Personalized Ranking from Implicit Feedback", Proceedings of the Twenty-Fifth Conference on Uncertainty in Arlincial Intelligence, Montreal, Canada, Jun. 18-21, 2009; pp. 452-461 (10 pages).
Weinsberg, U. et al., "BlurMe: Inferring and Obfuscating User Gender Based on Ratings", Proceedings of the sixth ACM Conference on Recommender Systems, Dublin, Ireland; Sep. 9-13, 2012, pp. 195-202 (8 pages).
Xie, Q. et al., "Controllable Invariance through Adversarial Feature Learning", Advances in Neural Information Processing Systems 30 (NIPS), May 31, 2017 (12 pages).
Beutel, A. et al., "Data Decisions and Theoretical Implications when Adversarially Learning Fair Representations", 2017 Workshop on Fairness, Accountability, and Transparency in Machine Learning (FAT/ML 2017), Jul. 1, 2017 (5 pages).

McSherry, F. et al., "Differentially Private Recommender Systems: Building Privacy into the Netflix Prize Contenders", Proceedings of the 15th ACM SIGKDD International Conference on Knowledge Discovery and Data Mining (KDD), Paris, France, Jun. 28-Jul. 1, 2009 (9 pages).
Ganin, Y. et al., "Domain-Adversarial Training of Neural Networks", Journal of Machine Learning Research vol. 17, Apr. 2016, pp. 1-35 (35 pages).
Peralta, Veronika, "Extraction and Integration of MovieLens and IMDb Data", Technical Report, Jul. 2007 (36 pages).
Liu, Z. et al., "Fast Differentially Private Matrix Factorization", Proceedings of the 9th ACM Conference on Recommender Systems, Vienna Austria, Sep. 16-20, 2015, pp. 171-178 (13 pages).
Zhang, B.H. et al., "Mitigating Unwanted Biases with Adversarial Learning", Published Jan. 22, 2018, Computer Science, Machine Learning (7 pages).
Nikolaenko, V. et al., "Privacy-Preserving Matrix Factorization", Proceedings of the 2013 ACM SIGSAC Conference an Computer & Communications Security, Berlin, Germany, Nov. 4-8, 2013, pp. 801-812 (12 pages).
Narayanan, A et al., "Robust De-anonymization of Large Sparse Datasets", 2008 IEEE Symposium on Security and Privacy, Oakland, Ca, USA, May 18-22, 2008 (15 pages).
Zhao, W.X. et al., "We Know What You Want to Buy: A Demographic-based System for Product Recommendation on Microblogs", Proceedings of the 20th ACM SIGKDD International Conference on Knowledge Discovery and Data Mining, New York, NY, USA, Aug. 24-27, 2014, pp. 1935-1944 (10 pages).

* cited by examiner

Thank you for ranking a movie.

See our top movie recommendations for you below!

Movies we think you'll like:

Forrest Gump (1994)

The Godfather (1972)

Gone with the Wind (1939)

Schindler's List (1993)

Rocky (1976)

ADVERSARIAL USER REPRESENTATIONS IN RECOMMENDER MACHINE LEARNING MODELS

BACKGROUND

With the increasing popularity of digital content consumption and the use of online systems to purchase various products, recommender machine learning models have become a major influencer of online behavior. Recommender machine learning models affect the news users read, movies watched, and products bought. Recommender machine learning models have revolutionized the way items are chosen across multiple domains, moving from the previous active search scenario to the more passive selection of presented content.

A recommender machine learning model generally fulfills two criteria in order to be able to supply relevant recommendations that will be helpful to users. Namely, the recommender machine learning model has to accurately model the users and the items. While performing in-depth modeling of users holds great value, modeling users may also pose privacy threats. Specifically, private information may be recoverable even when the private information is not present in the training data. In the implicit private information attack, either the recommendations or the user representations within a recommender system are used together with an external information to uncover private information about the users. For example, an attacker with access to the gender of a subset of the users could use their representations and a supervised learning approach to infer the gender of all users.

Modeling users may also cause a fairness issue. A lack of fairness occurs when similar recommendations are made to users having a common demographic property of the users when demographic property should not be used. By way of an example, if, in the past, certain types of high interest loans were generally selected by women, then the recommender machine learning model may learn to provide recommendations to women of the high interest loan. However, for fairness purposes, the type of loan selected should not be based on gender.

SUMMARY

In general, in one aspect, one or more embodiments relate to a method that includes generating recommendations and user structures by applying a recommender machine learning model to training user information and item information, and generating, from the user structures and by applying a demographic machine learning model, demographic predictions of users represented by the user structures. The method further includes generating a first accuracy measure of the demographic machine learning model based on a first comparison of the demographic predictions with demographics of the users. A recommender loss function is generated based on the first accuracy measure and a second comparison of the recommendations with selections of users, where the recommender loss function uses the first accuracy measure to suppress detectability by the demographic machine learning model. The method further includes updating the recommender machine learning model according to the recommender loss function.

In general, in one aspect, one or more embodiments relate to a system that includes a processor, a memory, a recommender machine learning model, a demographic machine learning model, and a model training and evaluation system. The memory is coupled to the processor and comprises training user information and item information. The recommender machine learning model executes on the processor, uses the memory, and is configured for generating, using the training user information and the item information, recommendations and user structures. The demographic machine learning model executes on the processor, uses the memory, and is configured for generating, from the user structures, demographic predictions of users represented by the user structures. The model training and evaluation system executes on the processor, uses the memory, and is configured for generating a first accuracy measure of the first demographic machine learning model based on a first comparison of the demographic predictions with demographics of the users, generating a recommender loss function based on the first accuracy measure and a second comparison of the recommendations with selections of the users, where the recommender loss function uses the first accuracy measure to suppress detectability by the first demographic machine learning model, and updating the recommender machine learning model according to the recommender loss function.

In general, in one aspect, one or more embodiments relate to a non-transitory computer readable medium comprising computer readable program code for generating recommendations and user structures by applying a recommender machine learning model to training user information and item information, and generating, from the user structures and by applying a demographic machine learning model, demographic predictions of users represented by the user structures. The computer readable program code is further for generating a first accuracy measure of the demographic machine learning model based on a first comparison of the demographic predictions with demographics of the users. A recommender loss function is generated based on the first accuracy measure and a second comparison of the recommendations with selections of users, where the recommender loss function uses the first accuracy measure to suppress detectability by the demographic machine learning model. The computer readable program code is further for updating the recommender machine learning model according to the recommender loss function.

Other aspects of the invention will be apparent from the following description and the appended claims.

BRIEF DESCRIPTION OF DRAWINGS

FIG. 6 shows example user interface of the recommender machine learning model in accordance with one or more embodiments.

DETAILED DESCRIPTION

Figure 1:
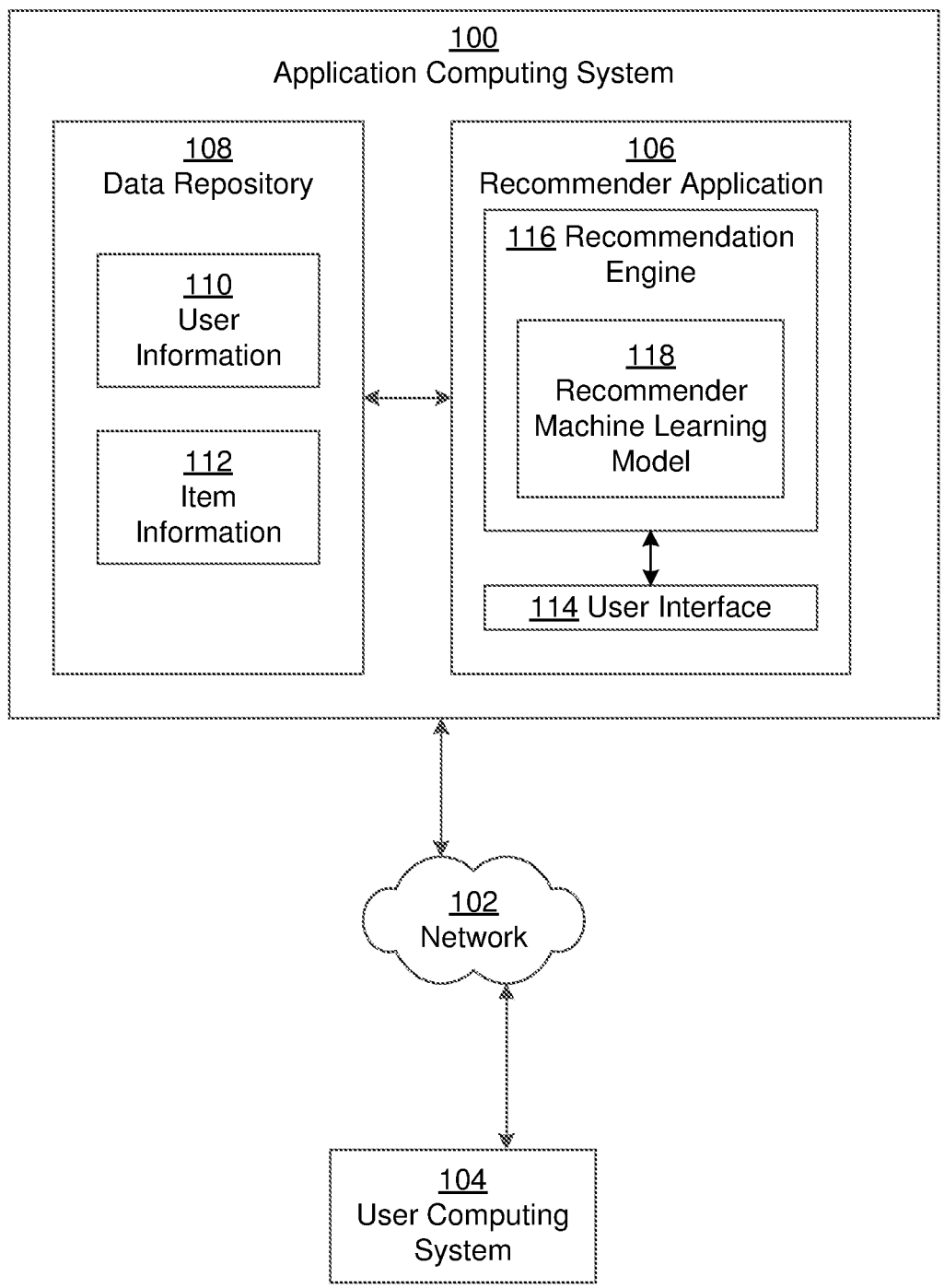
FIG. 1 shows a schematic diagram of machine learning based system that issues recommendations in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to adversarial based training of user representations when training a recommender machine learning model. In one or more embodiments, the recommender machine learning model generates a user representation of a user structure and an item representation. The user representation may be exploited causing a possibility of private demographic information being determinable from the user representation. Specifically, even though the system may not be explicitly provided with the private demographic information, the system may generate a user representation from which the private demographic information may be determined.

Further, the user representation may indicate a lack of fairness in the recommender machine learning model. In particular, a demographic property may be a protected property in that the recommender machine learning model should not intentionally or unintentionally use the protected property as a feature from which to base the recommendation. However, if the demographic property can be extracted from the user representation, then the demographic property is intentionally or unintentionally being used as a feature from which to base the recommendation. By way of an example, in providing recommendations for loans, gender may be a protected property. If gender is determinable from the user representation generated by the recommender machine learning model, then gender may be determined to be used by the recommender machine learning model. By way of another example, in providing recommendations for news content, political party may be a protected property in order to expose users to conflicting views.

In order to address privacy and fairness, one or more embodiments train the recommender machine learning model to both achieve the task of accurate recommendations and also reduce the prominence of a demographic property in the user structures. Specifically, while the recommender machine learning model is being trained, a demographic machine learning model is also being trained to predict the demographic property of a user based on the user representation generated by the recommender machine learning model. The demographic machine learning model is used in adversarial learning to update the recommender machine learning model. In other words, the more accurate that the demographic machine learning model is, the more that the recommender machine learning model is updated to change the user representation to make the prediction harder for the demographic machine learning model. Concurrently, both machine learning models are updated based on their own accuracy measures to improve accuracy of their respective tasks.

FIG. 1 shows a schematic diagram of machine learning based system that issues recommendations in accordance with one or more embodiments. As shown in FIG. 1, a user computing system (104) is connected via a network (102) to an application computer system (100). The application computing system (100) and user computing system (104) may be the same as the computing system described below with reference to FIGS. 7A and 7B. Further, the network (102) may be the network described below with reference to FIG. 7A.

The user computing system (104) is any device that is connected to a user. In one or more embodiments, the user computing system (104) includes functionality to execute a software application that connects the user to the recommender application. For example, the software application may be the recommender application, a local client application, a web browser, or another application.

The application computing system (100) includes a data repository (108) and a recommender application (106). In one or more embodiments of the invention, the data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site. The data repository (108) includes item information (112) and user information (110). The item information (112) is information describing one or more items.

An item is a target unit that may be recommended by the recommender machine learning model. For example, an item may be a movie, a clip, a song, a news article, a type of loan, document, physical or virtual product, or any other possible real or virtual object that may be recommended. The collection of items is the corpus from which an item may be recommended. For example, the collection of items may be a catalog of media offered by a company, a set of products offered by a company, or any other group of items. Item information (112) maintains metadata about the item. For example, the item information may include a name of the item, one or more categories of the item, a keyword or key phrase descriptor of the item, a description of the item, and other information.

Continuing with the data repository, user information (110) maintains information about one or more users of the recommender application. User information may or may not include demographic information. In general, demographic information includes demographic properties. A demographic property is an internal characteristic of a population of humans. For example, a demographic property may be gender, age, race, religion, sexual preference, political affiliation, location, national origin, physical disability, mental disability, veteran status, genetic information, and citizenship.

For each user, the user information relates past usage history with a user identifier of the user. For example, past usage history may include the items that have been selected in the past, rating of a selected or not selected item, length of time that the item was used and other interaction with the item or detailing the user's experience with the item.

Continuing with FIG. 1, the data repository is connected to a recommender application (106). The recommender application (106) is any software application that is configured to provide recommendations for items. The ability to provide recommendations may be ancillary to the goal of the recommender application. For example, the recommender application (106) may be a financial application, an electronic commerce application, a media player or media library application, a search engine, or another software application. In one or more embodiments, the recommender application (106) includes a user interface (114) and a recommendation engine (116).

The user interface (114) is an interface configured to interact with the user. For example, the user interface (114) may be an audio interface, a graphical user interface, or any other interface to interact directly or indirectly with the user. In one or more embodiments, the user interface (114) is configured to present recommendations to the user and receive user information from the user. The user interface (114) is connected to the recommendation engine (116).

The recommendation engine (116) is a software component that is configured to provide recommendations for the recommender application (106). In other words, the output of the recommender machine learning model is one or more recommendations, where each recommendation is a recommendation of an item for a particular user. Specifically, the recommender engine (116) includes functionality to receive user information (110) and item information (112) and present a recommended item, that may be selectable by a user. The recommendation engine (116) includes a recommender machine learning model (118). The recommender machine learning model (118) is a machine learning model that is configured to receive user information and item information and generate a recommendation of an item for a particular user. The recommender machine learning model provides functionality to the computer system by enabling the computer system to predict whether a user will want to select a particular item. In other words, a huge catalog of items, from thousands to millions of items, may exist. Similarly, millions of users may be concurrently accessing the recommender application and being provided recommendation. The recommender machine learning model (118) provides the tool by which the application computing system (100) can predict, with some accuracy, which item or subset of items that the user will select.

In order to provide recommendations, the recommender machine learning model (118) is concurrently trained to be accurate, fair, and private, whereby the fairness and privacy is with respect to at least one demographic property. The computing system for training the recommender machine learning model (118) may be the same or different than the computing system on which the recommender machine learning model is deployed.

Figure 2:
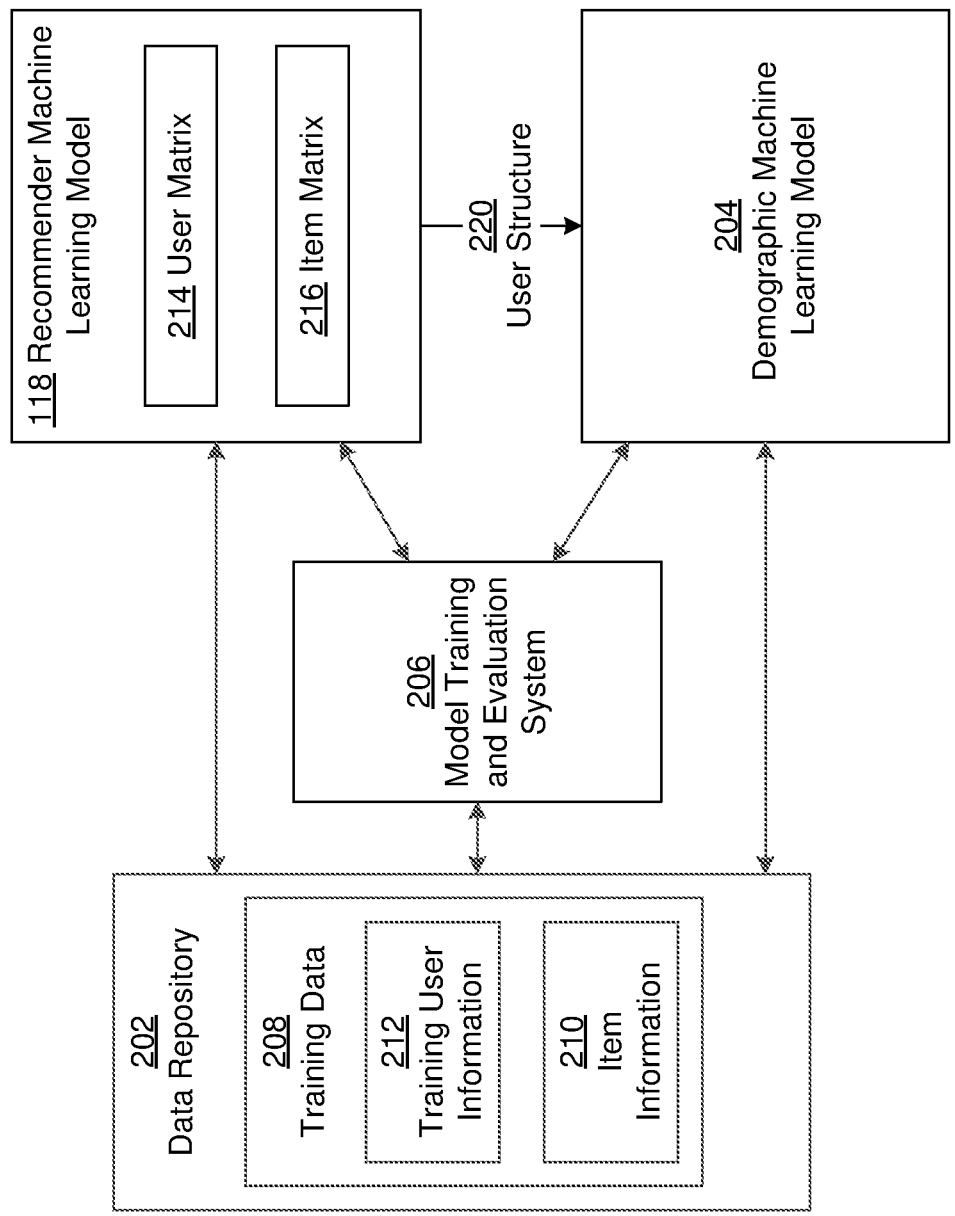
FIG. 2 shows a schematic diagram of a system for adversarial training of a recommender machine learning model in accordance with one or more embodiments.

FIG. 2 shows a schematic diagram of a system for adversarial training of a recommender machine learning model (118) in accordance with one or more embodiments. The system for adversarial training includes a data repository (202), recommender machine learning model (118), demographic machine learning model (204), and a model training and evaluation system (206).

The data repository (202) may be the same or similar to the data repository (108) in FIG. 1. The data repository (202) includes training data (208). Training data (208) is any data used to train the recommender machine learning model (118) and the demographic machine learning model (204). Individual training data (208) may exist for the recommender machine learning model (118) as the demographic machine learning model (204). Alternatively, the same training data may be used.

The training data (208) includes item information (210) and training user information (212). The item information (210) may be the same or similar to the item information (112) discussed above with reference to FIG. 1. The training user information (212) may be similar to the user information (110) discussed above with reference to FIG. 1, with additional training information. For example, the training user information (212) may be complete with respect to which items that the user selects and deselects with respect to the items in the training data set. In the example, each item in the item information in the training data may be associated with a corresponding value for each user indicating whether or not the user selected the item. For a particular user, a portion of the usage information in the training user information may be used as input to the recommender machine learning model (118), while another portion may be used to compare against the output of the recommender machine learning model (118) to determine accuracy and update the recommender machine learning model (118). Thus, for each user, for a portion of the items in the training data, the recommender machine learning model (118) may be provided with input as to whether the user selected the item while, for another portion of the items, whether the user selected the item may be used to determine whether the recommender machine learning model (118) is accurate in the prediction for retraining purposes.

By way of an example, the training user information may be a user information matrix. The user information matrix may be split into two matrices, whereby a first matrix is used as input to the recommender machine learning model and the second matrix is used to evaluate the recommender machine learning model.

The training user information (210) may further include one or more demographic properties of the user for training the demographic machine learning model. In other words, the demographic properties in the training user information (210) may be used to determine whether the prediction as to the demographic property of the user by the demographic machine learning model is accurate. In some embodiments, the demographic properties are not used as input to the demographic machine learning model or the recommender machine learning model. In such embodiments, the adversarial training limits latent exposure of demographic properties that is not the result of direct usage of such demographic properties.

Continuing with FIG. 2, the recommender machine learning model (118) is the same as the recommender machine learning model (118) discussed above with reference to FIG. 1. The recommender machine learning model (118) may be a neural network machine learning model. A neural network is a network of neuron-like nodes organized into successive "layers", each node in a given layer is connected with a directed connection to nodes in the next successive layer. Each node has a time-varying real-valued activation. Each connection has a modifiable real-valued weight. Nodes are either input nodes (receiving data from outside the network), output nodes (yielding results), or hidden nodes (that modify the data en route from input to output). Nodes operate on features within the input vector from the vector engine. The activation and weights of the nodes are the parameters that are modified during training to correctly extract features that will be used during the matching layer (120).

By way of another example, the recommender machine learning model may be a latent feature model. A latent feature model is a model in which each user is modeled as a set of features and each item is modeled as a set of features. The set of features for users and items are learned through training. As shown in FIG. 2, the recommender machine learning model (118) may include a user matrix (214) and an item matrix (216). The user matrix (214) has multiple rows where each row corresponds to a user and each column corresponds to a feature. As an example, the user matrix (214) may be a real value matrix whereby the value in an entry of the user matrix (214) is a number representing a degree to which the user exhibits the feature.

The item matrix (216) has multiple rows where each column corresponds to an item and each row corresponds to a feature. As an example, the item matrix (216) may be a real value matrix whereby the value in an entry of the item matrix (216) is a number representing a degree to which the item exhibits the feature. The definition of columns and rows may be inverted in the user matrix and item matrix without departing from the scope of the invention.

The affinity between each user and each item is the degree by which the user is predicted to select or not select the item. To determine the affinity, the dot product between a user vector and an item vector may be used. In Singular-Value Decomposition (SVD), the dot product between the user matrix and the item matrix approximates the user information matrix, described above, and may be used to provide recommendations. Specifically, in SVD, the dot product of the user matrix and the item matrix results in a matrix having multiple entries, whereby each entry corresponds to a user and an item, and the value of the entry is the predicted affinity.

The use of the term matrices, as used in this application, refers to a conceptual structure of the organization of data. Various data structures known in the art may be used to store the various matrices. Likewise, any of various data structures may be used to perform the matrix multiplication.

The recommender machine learning model (118) is directly or indirectly connected to the demographic machine learning model (204). In particular, the demographic machine learning model (204) is configured to obtain a user structure (220), directly or indirectly, from the recommender machine learning model (118). The user structure (220) is the user representation of the user, as discussed above. In other words, the user structure (220) defines how the user is represented to the recommender machine learning model (118). The user structure (220) may be a row of the user matrix (214), such as a vector.

The demographic machine learning model (204) is a machine learning model that is trained to detect a demographic property of a user, such as any demographic property described above. The output of the demographic machine learning model is a demographic prediction. The demographic prediction is the predicted value of a demographic property of a particular user. In one or more embodiments, the demographic machine learning model (204) is specific to a single demographic property. An individual demographic machine learning model may exist for each demographic property being monitored for privacy and/or fairness. For example, if race and gender are being monitored for privacy and/or fairness, then one demographic machine learning model may be trained to detect race and another demographic machine learning model may be trained to detect gender.

Rather than having an individual demographic machine learning model for each demographic property, a single demographic machine learning model may be used to predict multiple demographic properties.

In one or more embodiments, the input to the demographic machine learning model (204) is the user structure (220). Additional input may be used from the user information, such as the input that an attacker may be used. For example, if the demographic machine learning model is to detect age, zip code from the user information may be used as an added input to the demographic machine learning model (204).

In one or more embodiments, the demographic machine learning model is a classifier, such as a Bayesian personalized ranking model. The classifier determines the posterior probability that a user is of a particular class (i.e., has a particular demographic property value) based on the various input.

In one or more embodiments, the demographic machine learning model is a regressor. For example, a regressor may be used to predict numeric demographic properties, such as age.

In one or more embodiments, the recommender machine learning model (118) and the demographic machine learning model (204) is communicatively connected, directly or indirectly, to a model training and evaluation system (206). The model training and evaluation system (206) is configured to detect the accuracy of the various models and update the recommender machine learning model (118) and the demographic machine learning model (204). In particular, the model training and evaluation system (206) is configured to generate an accuracy measure for the demographic machine learning model and a separate accuracy measure for the recommender machine learning model. The model training and evaluation system (206) is further configured to generate a recommender loss function and a demographic loss function based on the accuracy measures. The demographic loss function is a function of the accuracy measure determined from the demographic prediction. The recommender loss function is a function of both accuracy measures. In particular, the accuracy measured determined from the demographic prediction is used to adversarially to update the recommender machine learning model in order to make the prediction by the demographic machine learning model using the user structure harder. Concurrently, the recommender loss function strives to improve the accuracy of the recommendations.

While FIGS. 1 and 2 show a configuration of components, other configurations may be used without departing from the scope of the invention. For example, various components may be combined to create a single component. As another example, the functionality performed by a single component may be performed by two or more components.

Figure 3:
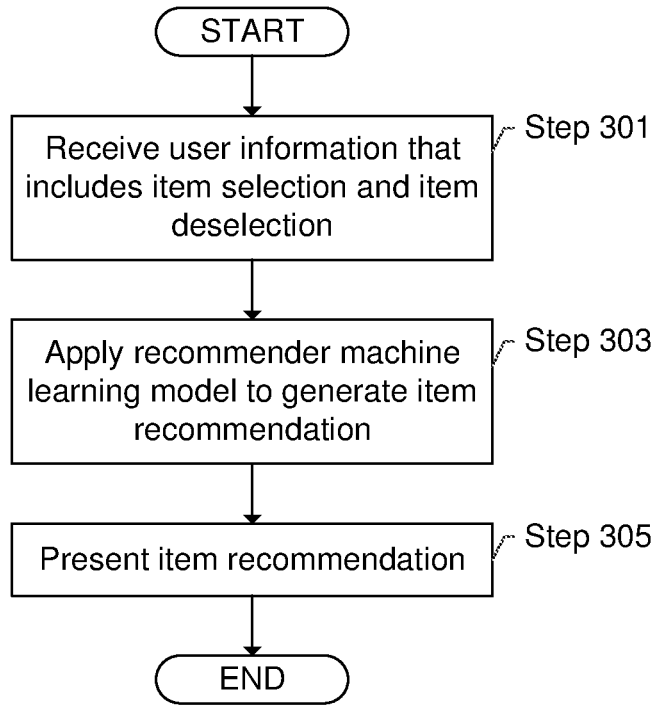
FIG. 3 shows a flowchart for providing recommendations using the recommender machine learning model in accordance with one or more embodiments.
Figure 4:
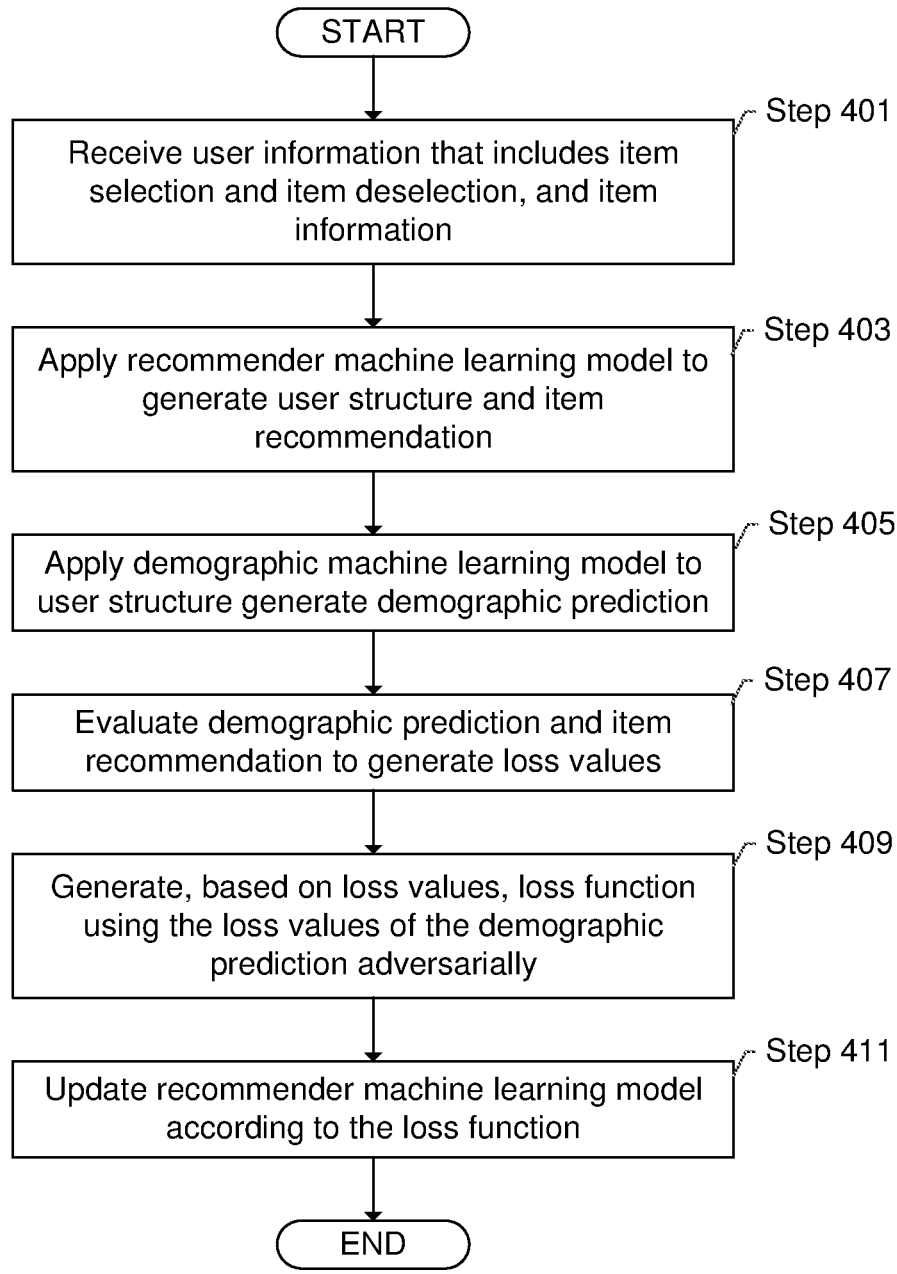
FIG. 4 shows a flowchart for adversarial training of the recommender machine learning model in accordance with one or more embodiments.

FIGS. 3 and 4 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for providing recommendations using the recommender machine learning model in accordance with one or more embodiments. In particular, FIG. 3 shows a flowchart for use of a recommender machine learning model when the recommender machine learning model is deployed. In Step 301, user information that includes item selection and item deselection is received. As items are added to the data repository to be a part of a catalog of items, item information for the items may be added to the data repository. Similarly, as users are using the recommender application, the recommender application may store user information. Initial user information, such as age of the user, user identifier, and other such information may be obtained and stored from the user computing device or created when the user initially creates an account. Initial recommendations may be more generic and based on the initial user information. As the user is using the recommender application, the user selects and deselects items. The selection of an item indicates interest in the item. Item selection may be merely viewing an item, or may involve an extra step, such as purchasing, viewing, or otherwise using the item. Item deselection, which may be viewing and then choosing not to perform the extra step, using and then rating with a low rating, or not viewing or using the item, indicates a lack of interest in the user to the item. The recommender application may monitor the usage and, in particular, which items are selected and deselected and store the information. Thus, when the user interface triggers a request for a recommendation, a user identifier is associated with a list of item identifiers that the user selected and a list of item identifiers that the user deselected. Past usage history of the user may be used to continually update the user representation. Additional user information may be used.

In Step 303, the recommender machine learning model is applied to generate an item recommendation. Based on the items that the user selects and the items that the user deselects as well as additional information, a user structure is generated. The features for the user structure are the features determined by the training of the recommender machine learning model. The inner product of the user structure with the item matrix generates an affinity value of the user to each item in one or more embodiments. Recommendations may be based on which items have a greater than a threshold level of affinity value. The recommendations may further be limited to a set number of items, whereby the topmost items are the items with the greatest affinity value.

In Step 305, the item recommendation is presented. One or more recommendations are presented to the user via the user interface. The recommendations may be presented directly to the user, or via a third-party intermediary. For example, the recommendations may be presented to an advisor or customer representative, who then tells the user of the recommendations. The user may then proceed to select or deselect an item. The result of whether the user selects or deselects an item may be fed back in the recommender machine learning model and the process may continue to provide further recommendations starting with Step 301.

FIG. 4 shows a flowchart for adversarial training of the recommender machine learning model in accordance with one or more embodiments. The training of the recommender machine learning model and demographic machine learning model may be continually performed as new user information is received. Specifically, not only does the usage by a user update the user's recommendations by having the system learn more information about the user, but also the user's selections and deselections may be used to update the features considered in the recommender machine learning model.

In Step 401, user information that includes item selection and item deselection, and item information may be received. The model training and evaluation system obtains the user information and item information from the training data. In some example embodiments, reinforcement learning is used, whereby actual usage information is continually obtained compared against actual data. The users selected for updating the model may be the users that have more than a threshold amount of user information in the data repository. Further, item information for all or a subset of items may be used.

As another example, the user information and item information may be designated as such by administrators and stored in the training data repository. In such an embodiment, supervised learning may be employed, whereby model training and evaluation system is provided with substantially free error free information.

In Step 403, the recommender machine learning model is applied to generate a user structure and an item structure. Initially, a predefined set of features are extracted from the user information and the item information. The initial predefined set of features may be manually selected. Through the machine learning, the importance of each of the features is learned and the user structure and the item structure are updated. In one or more embodiments, the features of the items are the same as the features of the users. Thus, one of the dimensions of the user matrix is the same as one of the dimensions of the item matrix. Using SVD, a dot product of the user matrix with the item matrix estimates a user information matrix. Each entry in the resulting matrix from the dot product corresponds to an individual user and an individual item, and the value in the entry is the estimated affinity between the user and the item. Values above a threshold may be recommended. The values may be ordered to determine a ranking of items for a particular user. Thus, the item recommendation is one or more items for a particular user.

In Step 405, the demographic machine learning model is applied to the user structure to generate a demographic prediction. The user structure is a row of the user matrix and may be extracted from the user matrix. The demographic prediction may be performed based on a Bayesian classifier applied to the user structure to determine a probability that the user belongs to a particular class (i.e., has the value of the demographic property). As another example, the demographic prediction may be performed by applying a neural network to the user structure. The user structure may be transmitted via the model training and evaluation system to multiple demographic machine learning models to obtain values for multiple demographic properties. Further, the application of the demographic machine learning model may be performed multiple times to multiple user structures of various users.

In Step 407, the demographic prediction and item recommendation are evaluated to generate loss values. The demographic prediction is compared with the corresponding demographic property of a user. By comparing multiple demographic predictions with multiple corresponding demographics of multiple users, an accuracy measure is generated that indicates how accurate the demographic machine learning model. Similarly, an accuracy measure of the recommendations may be determined by comparing the recommendations with the actual user selections that were not used to as input the recommender machine learning model.

In Step 409, based on the loss values, a loss function is generated that uses the loss values of the demographic prediction adversarially. The recommender loss function may have separate functions for user features and item features. For each of the user features in the user structure, a function that modifies the user feature with a first update value determined from the comparison of the recommendations with selections of the user, whereby the first update value is decreased by a second update value determined from the comparison of the demographic predictions and demographics of users. If more demographic machine learning models are used, then, for each feature, the first update value is further reduced by each comparison of the actual demographics and the corresponding demographic predictions of each of the additional demographic machine learning models. In other words, for each user feature, the recommender loss function accounts both for the accuracy measure of the recommender machine learning model, which is computationally opposed by the accuracy measure of the demographic machine learning model. Each of the item features in the recommender loss function may be updated only based on the accuracy measure of the recommender machine learning model.

The demographic loss function may be based only on the comparison of the demographic predictions with the demographics of the users. Namely, the demographic loss function is designed to improve the accuracy of the demographic predictions. Accordingly, an objective of the recommender loss function (i.e., to make demographic prediction harder) opposes the objective of the demographic loss function (i.e., to make demographic prediction more accurate).

In one or more embodiments, a reverse gradient approach is used as the recommender loss function. The following Equations Eq. 1 and Eq.2 are example equations for the recommender loss function.

$$p_u \leftarrow p_u - \alpha \left[ \frac{\partial loss_{recsys}}{\partial p_u} - \lambda \sum_i \frac{\partial loss_{recsys}}{\partial p_u} \right] \quad \text{(Eq. 1)}$$

$$p_i \leftarrow p_i - \alpha \left[ \frac{\partial loss_{recsys}}{\partial p_i} \right] \quad \text{(Eq. 2)}$$

Eq. 1 is an equation to update the user features. In particular, a new value for a parameter, such as weight, of the user feature is defined according to equation Eq. 1. Eq. 2 is an equation to update the item features. In particular, a new value for a parameter, such as weight, of the item feature is defined according to equation Eq. 2. In Equation Eq. 1 and Eq.2, $p_u$ and $p_i$ are the parameters of the user feature and item feature, respectively. Further, $\alpha$ and $\lambda$ are constants, $\partial loss_{recsys}/\partial p_u$ is first update value and the partial derivative of the loss of the recommender machine learning model with respect to the corresponding user parameter, and $\partial loss_{recsys}/\partial p_i$ is the partial derivative of the loss of the recommender machine learning model with respect to the corresponding item parameter. Additionally, the summation over i of $\partial loss_{demophics}/\partial p_u$ is second update value and the partial derivative of the loss of the demographic machine learning model with respect to the corresponding user parameter.

The following are example equations for the demographic loss function.

$$p_d \leftarrow p_d - \alpha \left[ \frac{\partial loss_{demographics}}{\partial p_d} \right] \quad \text{(Eq. 3)}$$

In Equation Eq. 3, $p_d$ is the parameter of the demographic feature. Further, $\alpha$ is a constant and may or may not be the same as in Eq. 1 and Eq. 2. $\partial loss_{demographics}/\partial p_d$ is the partial derivative of the loss of the demographics machine learning model with respect to the corresponding demographic parameter.

In Step 411, the recommender machine learning model is updated according to the loss function. Specifically, the item features and the user features are updated according to the recommender loss function by taking the old values and applying the corresponding loss function to create new values. Similarly, the demographic machine learning model is updated based on the demographics loss function.

As shown above, by accounting for the demographics, a recommender machine learning model may be generated that is fair and makes detecting personal information harder.

The following example is for explanatory purposes only and not intended to limit the scope of the invention.

Figure 5:
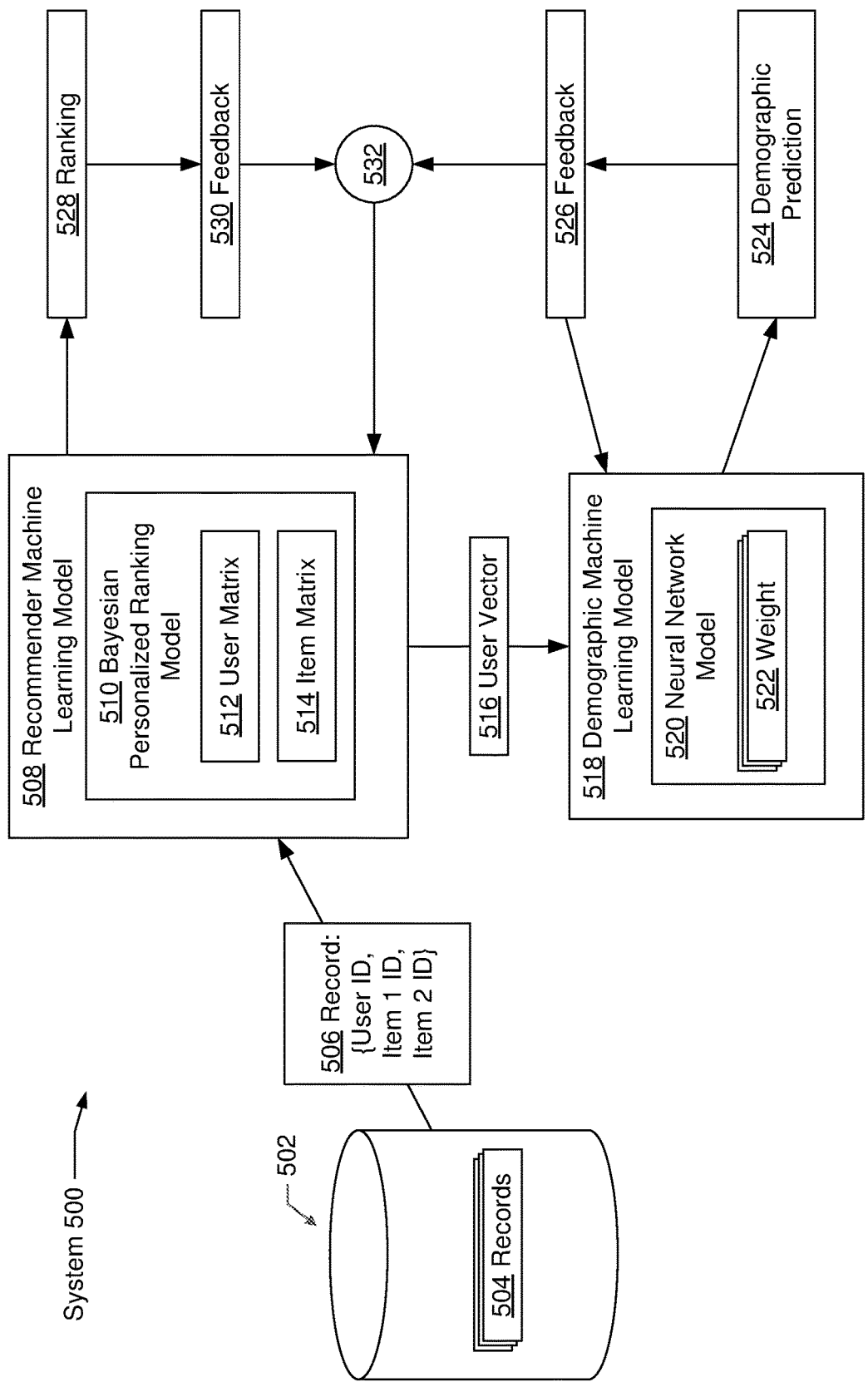
FIG. 5 shows an example system in accordance with one or more embodiments.

FIG. 5 shows an example system (500) in accordance with one or more embodiments. As shown in FIG. 5, records (504), including user records and item records are stored in database (502). One or more records, such as record (506) having user identifiers and item identifiers, are transmitted to the recommender machine learning model (508). The recommender machine learning model (508) may apply a Bayesian personalized ranking model (510) to create a user matrix (512) and item matrix (514). The multiplication of the user matrix (512) and item matrix (514) provides the affinity between the users and items. The affinity values from the user item matrix generates a ranking (528), where the ranking includes recommendations.

Concurrently, a user vector (516) from the user matrix (512) is transmitted from the recommender machine learning model (508) to the demographic machine learning model (518). The demographic machine learning model (518) may apply a neural network model (520) having various weights (522) on the features to generate a demographic prediction (526). Feedback (526) of the accuracy of the demographic prediction is used to update the weights (522) with the objective of making the neural network model (520) more accurate. The feedback (526) is also used concurrently with feedback (530) from the accuracy of the ranking (528) in block 532 to update the parameters of the recommender machine learning model.

The result of FIG. 5 may be the recommendations shown in FIG. 6. FIG. 6 shows example output user interface (600) of the recommender machine learning model in accordance with one or more embodiments. Consider the following scenario used in an experiment in which the system is used to show a listing of motion pictures (e.g., movies).

In an example set of experiments conducted on a MovieLens dataset having 1,000,209 ratings from 6,040 users, on 3,706 movies. In addition, demographic information in the form of age and gender is provided for each user. Gender (male/female) is skewed towards male with 71.7% in the male category. Age is divided into 7 groups (0-18, 18-25, 25-35, 35-45, 45-50, 50-56, 56-inf) with 34.7% in the most popular age group, being 25-35. This means that when absolutely no personal data is given about an arbitrary user, the prediction accuracy of gender and age group cannot exceed 71.7% and 34.7% respectively.

In the experiments, the Bayesian Personalized Ranking (BPR) recommendation system is modified with adversarial demographic prediction as described in FIG. 5 by appending a linear readout structure from the user vectors to each of the demographic targets (binary gender and 7-category age). Gradient reversal is applied between the user-vectors and each of the demographic readout structures, so that effectively during training the user vectors are optimized with respect to the recommendation task, but de-optimized with respect to the gender prediction. At the same time, the demographic readout is optimized to use the current user representation to predict gender and age. The result of this scheme is a user representation that is good for recommendation but not good for demographic prediction. The same methodology could be applied to any type of recommendation system which includes user representations and is trained using a gradient based method.

Recommendation systems were evaluated using a testing set. For each user in the dataset, the final movie that the user watched was set aside for testing, and never seen during training. The fraction of users for whom this held out movie was in the top-k recommendation is reported as model accuracy (e.g., k=10). Private information in the user representations was evaluated using both a neural network predictor of the same form used during adversarial training, and a host of standard classifiers (SVMs with various parameters and kernels, Decision Trees, Random Forest—see Table 1). The rest of the results are shown for the original neural classifier with a cross validation procedure.

With respect to privacy, results show that private demographic information does indeed exist in user representations in the standard system. Gender prediction (Table 2, $\lambda=0$ column) increases with size of user representation (e.g., user vector), and reaches 77.8% (recall 71.7% are Male). Likewise, age bracket prediction also increases with size of user representation and reaches 44.90% (largest category is 34.7%). These results serve as the baseline against which the adversarial training models are tested against. The goal of the privacy-adversarial setting is to reduce the classification results down to the baseline, reflecting user representations were purged of this private information.

In the privacy-adversarial setting, overall prediction results for both gender and age are diminished to the desired level of the largest class baseline. With $\lambda=0.1$, for example, age prediction is eliminated completely (reducing effectively to the 34.7% baseline) for all sizes of representation, and likewise for gender with representation of size 10-20. For size 50, some residual predictive power of the demographic machine learning model exists, though the predict power is highly reduced relative to the regular recommendation system.

With respect to the trade-off between system performance and privacy, results indicate (Table. 4) that smaller user representations (size 10) are preferential for this small dataset. As expected, some degradation with adversarial training, but nevertheless the private information almost entirely eliminated with representations of size 10 and $\lambda=0.1$ while sacrificing only a small proportion of performance (accuracy@10 of 2.88% instead of the 3.05% for the regular system, gender information gap of 0.37% and age information gap of 0.41% from the majority group). Together, the results show the existence of the privacy leakage in a typical recommendation system, and the ability to eliminate the privacy leakage with privacy-adversarial training while harming the overall system performance only marginally.

Figure 7A:
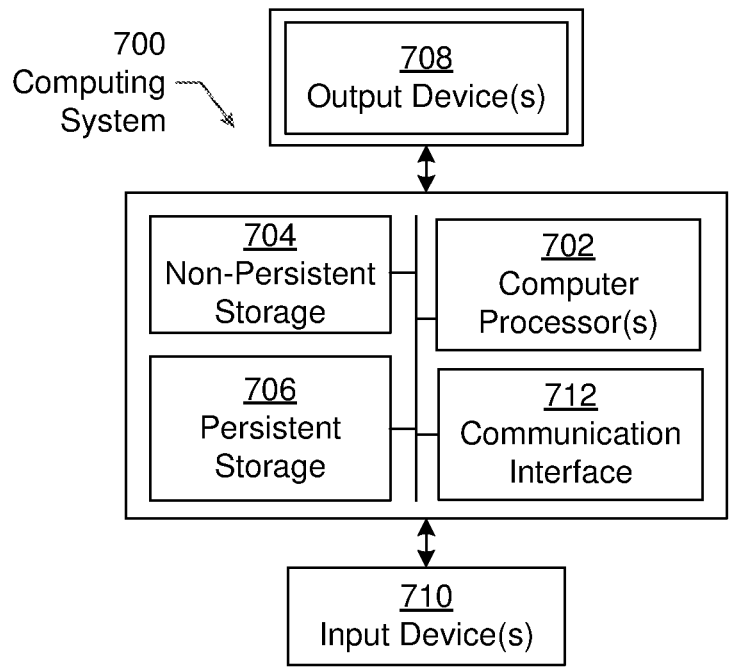
FIGS. 7A and 7B show a computing system in accordance with one or more embodiments.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
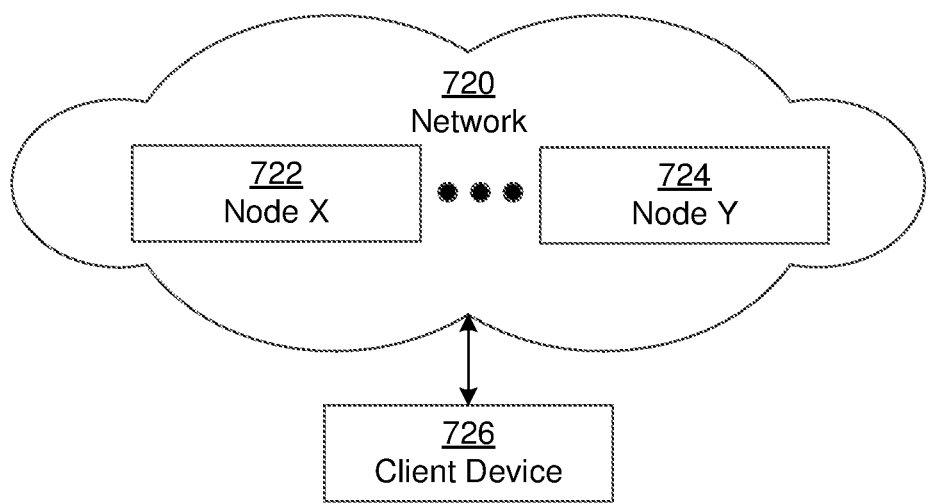

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    processing, by a computing system executing a recommender machine learning model, user information and item information to generate a plurality of recommendations and a plurality of user structures, wherein each of the plurality of user structures relate a user of a plurality of users to a degree of the user exhibiting each of a plurality of features;
    processing, by the computing system executing a first demographic machine learning model, the plurality of user structures generated by the recommender machine learning model to generate a first plurality of demographic predictions of a plurality of demographics of the plurality of users based on the degree of the user exhibiting each of the plurality of features, wherein the first demographic machine learning model is a separate model from the recommender machine learning model;

generating, by the computing system, a first accuracy measure of the first demographic machine learning model based on a first comparison of the first plurality of demographic predictions with the plurality of demographics of the plurality of users;

generating, by the computing system, a recommender loss function based on the first accuracy measure and a second comparison of the plurality of recommendations with a plurality of selections of the plurality of users; and updating, by the computing system, the recommender machine learning model according to the recommender loss function, wherein updating the recommender machine learning model comprises suppressing detectability of the plurality of demographics of the plurality of users by the recommender loss function using the first accuracy measure.

2. The method of claim 1, further comprising:
generating a demographic loss function based on the comparison of the first plurality of demographic predictions with the plurality of demographics of the plurality of users;
updating the first demographic machine learning model according to the demographic loss function.

3. The method of claim 1, wherein the recommender loss function comprises:
for each of a plurality of user features in the user structure, a first function that modifies the user feature with a first update value determined from the second comparison, the first update value decreased by a second update value determined from the first comparison.

4. The method of claim 3, further comprising:
for each of a plurality of item features in an item structure, a second function that modifies the item feature with a third update value based on the second comparison.

5. The method of claim 3, wherein the first update value is a partial derivative.

6. The method of claim 1, wherein the first demographic machine learning model is specific to a first demographic prediction, and the first demographic prediction is one of gender, age, race, religion, sexual preference, political affiliation, location, national origin, physical disability, mental disability, veteran status, genetic information, and citizenship.

7. The method of claim 6, further comprising:
generating, from the plurality of user structures and by applying a second demographic machine learning model, a second plurality of demographic predictions of the plurality of users represented by the plurality of user structures, the second demographic machine learning model specific to a second demographic prediction; and
generating a second accuracy measure of the first demographic machine learning model based on a third comparison of the second plurality of demographic predictions with the plurality of demographics of the plurality of users,
wherein the recommender loss function is further based on the second accuracy measure to suppress detectability by the second demographic machine learning model.

8. The method of claim 1, further comprising:
updating the first demographic machine learning model using gradient descent, wherein the first demographic machine learning model is a classifier.

9. The method of claim 1, further comprising:
updating the recommender machine learning model using gradient descent, wherein the recommender machine learning model is a latent feature model.

10. The method of claim 1, wherein the first demographic machine learning model is a Bayesian personalized ranking model.

11. The method of claim 1, wherein the first demographic machine learning model is a neural network that takes, as an input, a row from a matrix of a Bayesian personalized ranking model, wherein the row is a user structure in the plurality of user structures.

12. A system comprising:
a processor;
a memory coupled to the processor comprising training user information and item information;
a recommender machine learning model that executes on the processor, uses the memory, and is configured for:
generating, using the training user information and the item information, a plurality of recommendations and a plurality of user structures, wherein each of the plurality of user structures relate a user of a plurality of users to a degree of the user exhibiting each of a plurality of features;
a first demographic machine learning model that executes on the processor, uses the memory, and is configured for:
generating, from the plurality of user structures generated by the recommender machine learning model, a first plurality of demographic predictions of a plurality of demographics of the plurality of users based on the degree of the user exhibiting each of the plurality of features represented by the plurality of user structures, wherein the first demographic machine learning model is a separate model from the recommender machine learning model; and
a model training and evaluation system that executes on the processor, uses the memory, and is configured for:
generating a first accuracy measure of the first demographic machine learning model based on a first comparison of the first plurality of demographic predictions with the plurality of demographics of the plurality of users,
generating a recommender loss function based on the first accuracy measure and a second comparison of the plurality of recommendations with a plurality of selections of the plurality of users, and
updating the recommender machine learning model according to the recommender loss function, wherein updating the recommender machine learning model comprises suppressing detectability of the plurality of demographics of the plurality of users by the recommender loss function using the first accuracy measure.

13. The system of claim 12, further comprising:
a second demographic machine learning model that executes on the processor, uses the memory, and is configured for:
generating, from the plurality of user structures, a second plurality of demographic predictions of the plurality of users represented by the plurality of user structures, the second demographic machine learning model specific to a second demographic prediction,
wherein the model training and evaluation system is further configured for:
generating a second accuracy measure of the first demographic machine learning model based on a third comparison of the second plurality of demographic predictions with the plurality of demographics of the plurality of users, wherein the recommender loss function is further based on the second accuracy measure to suppress detectability by the second demographic machine learning model.

14. A non-transitory computer readable medium comprising computer readable program code for:

processing, by a computer system executing a recommender machine learning model, user information and item information to generate a plurality of recommendations and a plurality of user structures, wherein each of the plurality of user structures relate a user of a plurality of users to a degree of the user exhibiting each of a plurality of features;

processing, by the computer system executing a first demographic machine learning model, the plurality of user structures generated by the recommender machine learning model to generate a first plurality of demographic predictions of a plurality of demographics of the plurality of users based on the degree of the user exhibiting each of the plurality of features represented by the plurality of user structures, and wherein the first demographic machine learning model is a separate model from the recommender machine learning model;

generating a first accuracy measure of the first demographic machine learning model based on a first comparison of the first plurality of demographic predictions with the plurality of demographics of the plurality of users;

generating a recommender loss function based on the first accuracy measure and a second comparison of the plurality of recommendations with a plurality of selections of the plurality of users; and updating the recommender machine learning model according to the recommender loss function, wherein updating the recommender machine learning model comprises suppressing detectability of the plurality of demographics of the plurality of users by the recommender loss function using the first accuracy measure.

15. The non-transitory computer readable medium of claim 14, further comprising computer readable program code for:

generating a demographic loss function based on the comparison of the first plurality of demographic predictions with the plurality of demographics of the plurality of users;

updating the first demographic machine learning model according to the demographic loss function.

16. The non-transitory computer readable medium of claim 14, wherein the recommender loss function comprises:

for each of a plurality of user features in the user structure, a first function that modifies the user feature with a first update value determined from the second comparison, the first update value decreased by a second update value determined from the first comparison.

17. The non-transitory computer readable medium of claim 16, further comprising computer readable program code for:

for each of a plurality of item features in an item structure, a second function that modifies the item feature with a third update value based on the second comparison.

18. The non-transitory computer readable medium of claim 16, further comprising computer readable program code for:

generating, from the plurality of user structures and by applying a second demographic machine learning model, a second plurality of demographic predictions of the plurality of users represented by the plurality of user structures, the second demographic machine learning model specific to a second demographic prediction; and generating a second accuracy measure of the first demographic machine learning model based on a third comparison of the second plurality of demographic predictions with the plurality of demographics of the plurality of users, wherein the recommender loss function is further based on the second accuracy measure to suppress detectability by the second demographic machine learning model.

19. The non-transitory computer readable medium of claim 14, wherein the first demographic machine learning model is a Bayesian personalized ranking model.

20. The non-transitory computer readable medium of claim 14, wherein the first demographic machine learning model is a neural network that takes, as an input, a row from a matrix of a Bayesian personalized ranking model, wherein the row is a user structure in the plurality of user structures.

* * * * *